United States Patent [19]

Hosoya

[11] 4,305,089
[45] Dec. 8, 1981

[54] COLOR LEVEL AUTOMATIC CONTROL SIGNAL GENERATING CIRCUIT FOR GENERATING COLOR LEVEL AUTOMATIC CONTROL SIGNALS THROUGH UTILIZATION OF VIR SIGNALS

[75] Inventor: Nobukazu Hosoya, Moriguchi, Japan

[73] Assignee: Sanyo Electric Co., Ltd., Osaka, Japan

[21] Appl. No.: 111,094

[22] Filed: Jan. 10, 1980

Related U.S. Application Data

[63] Continuation of Ser. No. 904,304, May 9, 1978, abandoned.

[30] Foreign Application Priority Data

May 9, 1977 [JP] Japan ................................ 52-54524
May 9, 1977 [JP] Japan ................................ 52-54525

[51] Int. Cl.³ .......................................... H04N 9/535
[52] U.S. Cl. ................................................ 358/21 V
[58] Field of Search ................... 358/10, 21 V, 27, 28, 358/34

[56] References Cited

U.S. PATENT DOCUMENTS

| 3,128,334 | 4/1964 | Heuer ..................................... 358/34 |
| 3,701,843 | 10/1972 | Hepner et al. ..................... 358/34 X |
| 3,736,370 | 5/1973 | Thielking ............................... 358/34 |
| 4,059,838 | 11/1977 | Banker et al. ..................... 358/21 V |
| 4,096,515 | 6/1978 | Brown, Jr. et al. ............... 358/21 V |
| 4,101,927 | 7/1978 | Ison et al. ......................... 358/21 V |
| 4,153,911 | 5/1979 | Isono et al. ....................... 358/21 V |

OTHER PUBLICATIONS

GE's Broadcast-Controlled Color System-Part 2, Electronic Technician/Dealer, Sep. 76, pp. 20-29.

Primary Examiner—Aristotelis M. Psitos
Attorney, Agent, or Firm—Armstrong, Nikaido, Marmelstein & Kubovcik

[57] ABSTRACT

The present invention relates to an improved circuit arrangement for use in color television receivers for generating color level automatic control signal through utilization of VIR (Vertical interval reference) signal included in the vertical retrace interval of the television signal being transmitted, in which circuit arrangement, video signal and B-Y demodulation signal are each subjected to D.C. restoration, and further compared by a comparator to utilize the difference therebetween as the color level automatic control signal.

10 Claims, 15 Drawing Figures

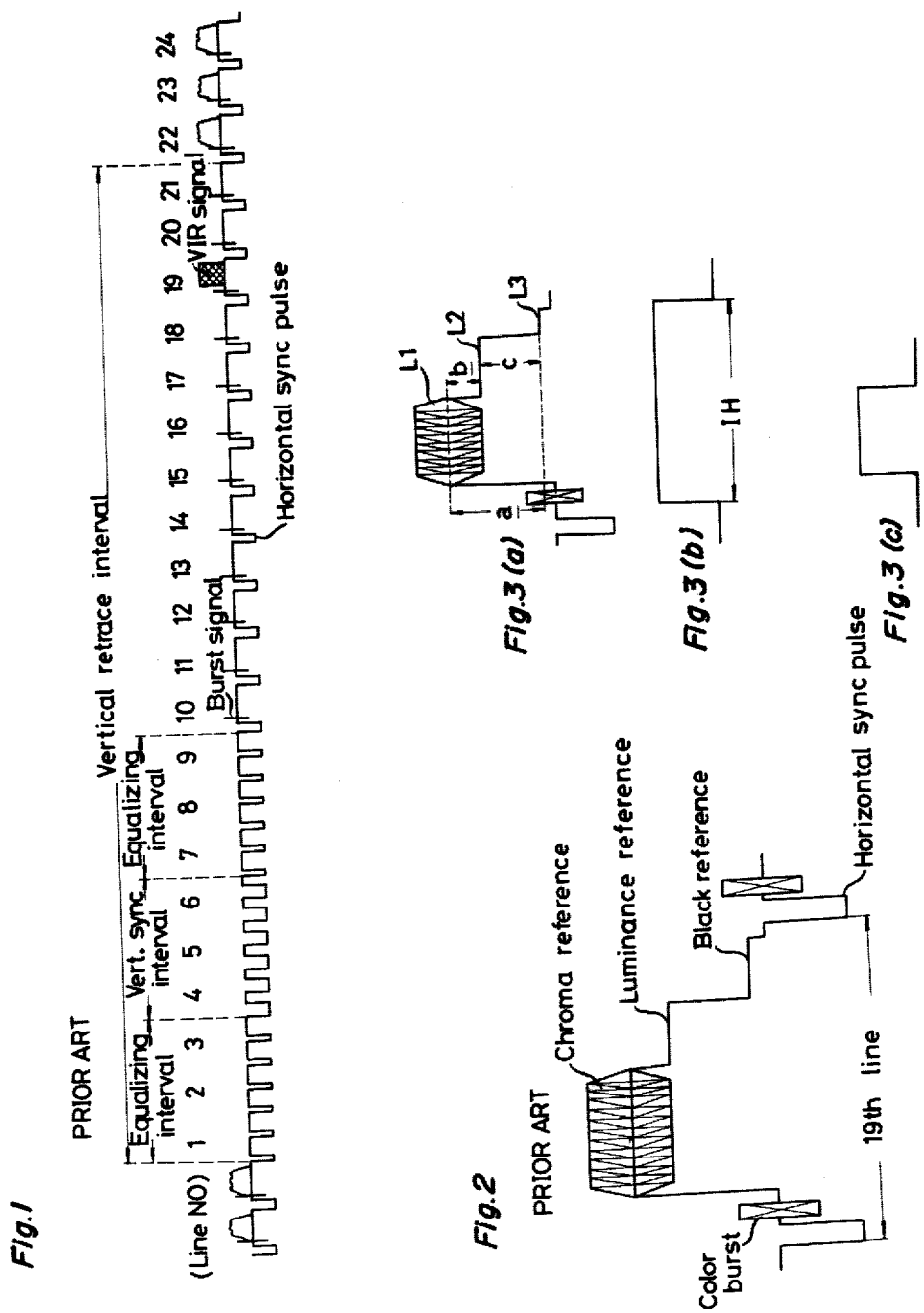

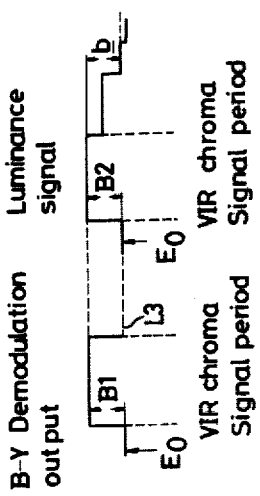
Fig.7 (a)
Fig.7 (b)
Fig.7 (c)
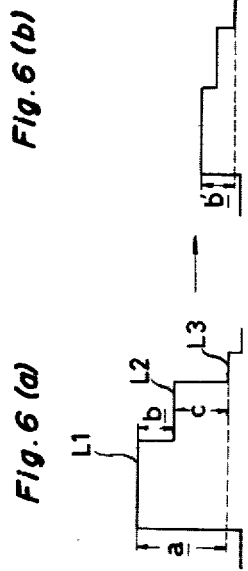
Fig.9
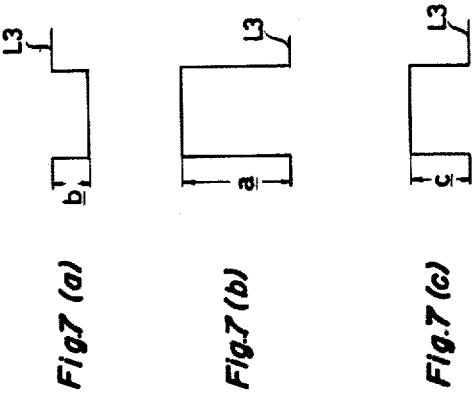
Fig.5
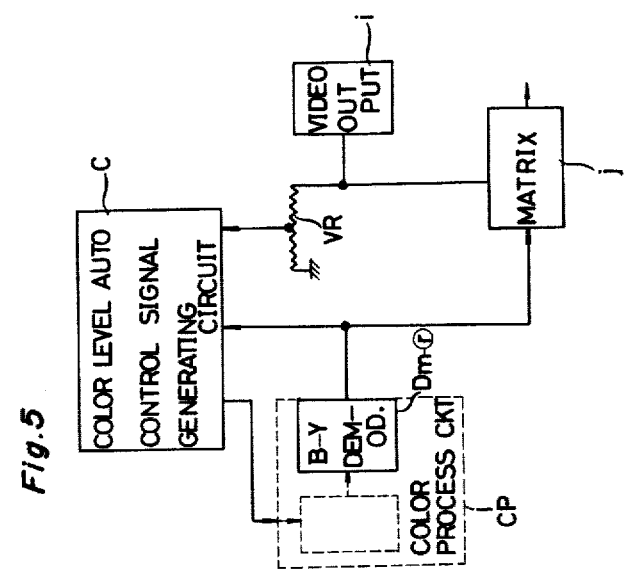
Fig.6 (a)
Fig.6 (b)

COLOR LEVEL AUTOMATIC CONTROL SIGNAL GENERATING CIRCUIT FOR GENERATING COLOR LEVEL AUTOMATIC CONTROL SIGNALS THROUGH UTILIZATION OF VIR SIGNALS

This is a continuation of application Ser. No. 904,304, filed May 9, 1978, now abandoned.

BACKGROUND OF THE INVENTION

The present invention relates to television circuitry and more particularly, to a circuit arrangement for generating color level automatic control signal through utilization of VIR (Vertical interval reference) signal contained in vertical retrace interval of television signal being transmitted.

Commonly, in color television broadcasting, it has been a tendency that hue, brightness, etc. of the color video information contained in television signal are liable to be varied or deteriorated during transmission of the television signal from a broadcasting station to television receivers of viewers in general. In order to overcome such inconveniences, there have conventionally been proposed, for example, in U.S. Pat. Nos. 3,780,218 and 3,950,780, circuit arrangements for use in color television receivers for automatic hue control and the like through utilization of the so-called Vertical interval reference (referred to as VIR hereinbelow) system, in which the deterioration as described above is corrected by reference signal (VIR signal) included in the vertical retrace interval of the transmitted television signal, and in the United States, several broadcasting stations have already employed such VIR system for transmission of television signal, with the VIR signal included in the vertical retrace interval of the television signal.

More specifically, in the composite video signal shown in FIG. 1, such VIR signal is included, for example, in the nineteenth line of the vertical retrace interval containing twenty-one lines, while the VIR signal includes reference signals such as chroma reference, luminance reference, black reference signals, etc.

For automatic control of the color level with the use of such VIR signal, conventional practice has been such that a luminance reference level L2 as shown in FIG. 3(a) is subjected to sample holding so as to be the same level as a level L'2 in the chroma reference signal period of the VIR signal in a subsequent field for controlling a color process circuit of the television receiver. The known arrangement as described above, however, has a serious disadvantage in that accurate control of tint or color level can not be effected, since two levels having a time difference of one field must be compared, with contents of one of the levels tending to be varied.

SUMMARY OF THE INVENTION

Accordingly, an essential object of the present invention is to provide an improved circuit arrangement for use in a color television receiver for generating color level automatic control signal which generates automatic control signal capable of accurately controlling color level, with substantial elimination of disadvantages inherent in the conventional circuit arrangements of the kind.

Another important object of the present invention is to provide an improved circuit arrangement of the above described type which is associated with a control signal change-over circuit for changing over between automatic control signal and manual control signal according to automatic and manual modes of operation of the television receiver.

A further object of the present invention is to provide an improved circuit arrangement of the above described type which is stable in functioning and simple in construction, and can be readily incorporated into circuits of television receivers at low cost.

In accomplishing these and other objects, according to one preferred embodiment of the present invention, there is provided an improved color level automatic control signal generating circuit arrangement for use in color television receivers for generating color level automatic control signal through utilization of VIR signal included in vertical retrace interval of television signal being transmitted. The circuit arrangement of the invention includes means for subjecting to a first D.C. restoration, demodulator output having demodulating axis selectively of same phase as and opposite phase to phase of chroma signal in the VIR signal, at a predetermined level during one H time of a line containing the VIR signal, means for subjecting to a second D.C. restoration, video detection output divided to be reduced by a predetermined value, at the same level as the level of said first D.C. restoration during the one H time, and means for comparing said demodulator output with said video signal output divided to be reduced by the predetermined value, during the chroma signal period of the VIR signal so as to output difference therebetween as the color level automatic control signal.

By the above arrangement, the inconvenience in the conventional arrangements such as the undesirable variation in only one of the comparison signals, etc., is advantageously eliminated, thus accurate automatic control signal being obtained, with substantial elimination of disadvantages inherent in the known arrangements of the kind.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a schematic diagram already referred to and showing a waveform of conventional composite video signal in which VIR (Vertical interval reference) signal is included, FIG. 2 is a similar diagram to FIG. 1, but particularly shows, on an enlarged scale, structure of the VIR signal included in the composite video signal of FIG. 1, FIGS. 3(a) to 3(c) are waveform diagrams of signals explanatory of a color level automatic control signal generating circuitry according to the present invention, FIG. 5 is a similar diagram to FIG. 4, but particularly shows connection of the color level automatic control signal generating circuit arrangement of the present invention with respect to related circuits of a color television receiver, FIGS. 6(a) to 7(c) are waveform diagrams explanatory of the color level automatic control signal generating circuit arrangement according to the present invention, FIG. 9 is a waveform diagram explanatory of functioning of the circuit arrangement of FIG. 8.

Before the description of the present invention proceeds, it is to be noted that like parts are designated by like reference numerals and symbols throughout several views of the accompanying drawings.

DETAILED DESCRIPTION OF THE INVENTION

Figure 4:
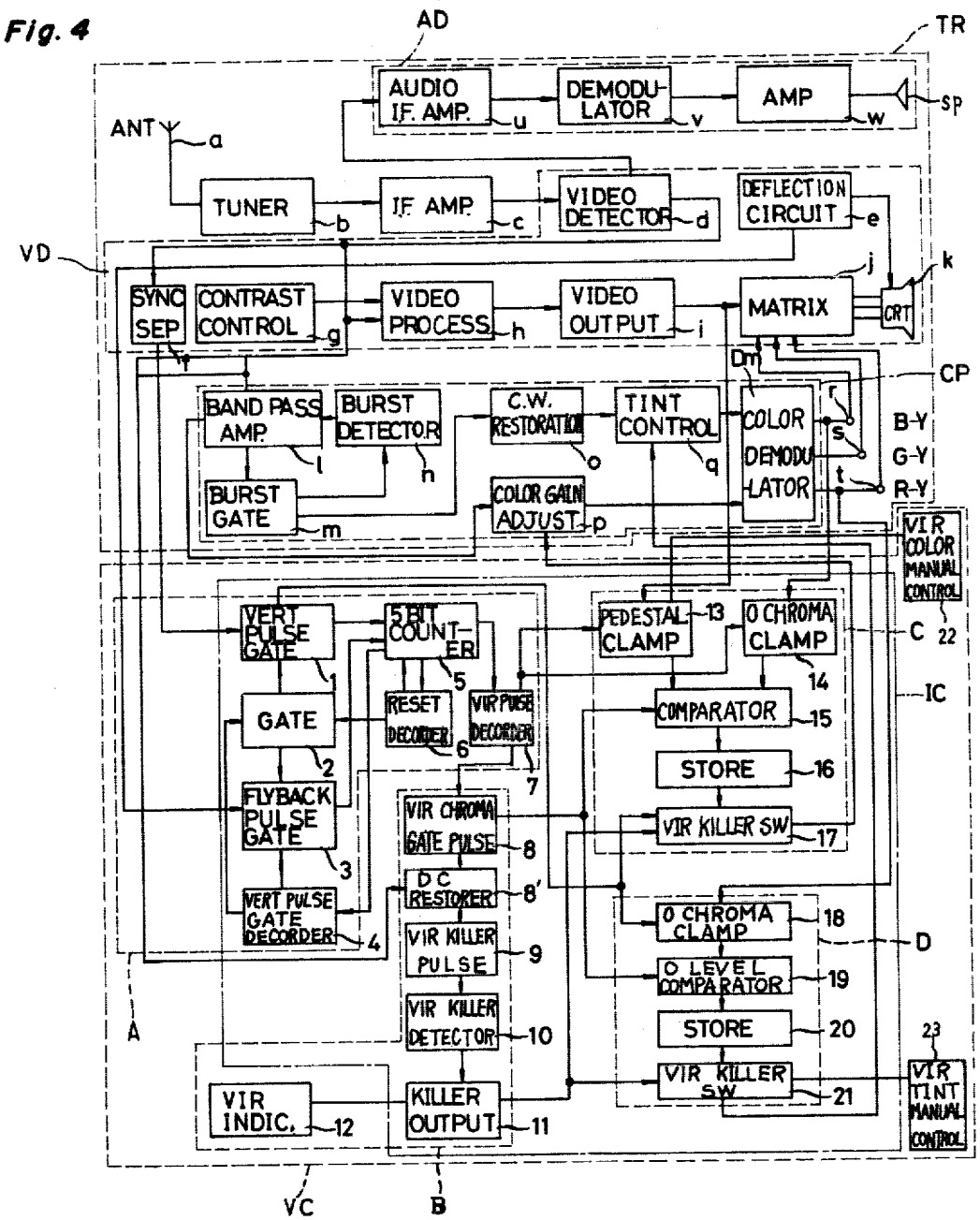
FIG. 4 is an electrical block diagram showing a circuit construction of a color television receiver in which the color level automatic control signal generating circuitry of the invention is incorporated.

Referring now to the drawings, there is shown in FIG. 4 an electrical block diagram of a color television receiver circuitry TR having a VIR circuit VC incorporated therein. The color television receiver circuitry TR generally comprises an audio circuit AD including an audio I.F. amplifier u, a demodulator v, an amplifier w and a speaker unit sp, an antenna a, a tuner b, an I.F. amplifier c, a video circuit VD including a video demodulator d, a deflection circuit e, a synchronizing separator f, a contrast control g, a video process h, a video output circuit i, a matrix j and a cathode ray tube k, and a color process circuit CP including a band pass amplifier l, a burst gate m, a burst detector n, a carrier wave restoration circuit o, a color gain adjuster p, a tint control q and a color demodulator Dm, all of which are coupled to each other in a known manner. Meanwhile, the VIR circuit VC further comprises a line sampling circuit A (i.e., a circuit which detects the VIR signal and develops pulses corresponding to such VIR signal in the presence of the VIR signal) including a vertical pulse gate 1 connected to the synchronizing separator f of the video circuit VD, a gate 2 connected to the vertical pulse gate 1, a flyback pulse gate 3 coupled to the deflection circuit e of the video circuit VD, a vertical pulse gate decoder 4 connected to the gate 3 and gate 2, a 5 bit counter 5 coupled to the gates 1 and 3 and decoder 4, a reset decoder 6 connected to the counter 5 and gate 2, and a VIR pulse decoder 7 connected to the counter 5, a VIR killer pulse generator B including a VIR chroma gate pulse generator 8 connected to the decoder 7 in the line sampling circuit A and to a DC restorer 8', which is further connected to the video detector d in the video circuit VD, and also to a VIR killer pulse generator 9, and a killer output circuit 11 which is connected to the generator 9 through a VIR killer detector 10 and also to a VIR indicator 12, a color level automatic control signal generating circuit C directly related to the present invention and including a pedestal clamp circuit 13 connected to the VIR pulse decoder 7 of the line sampling circuit A and also to the video output circuit i of the video circuit VD, a O chroma clamp circuit 14 also connected to the VIR pulse decoder 7 of the line sampling circuit A for receiving VIR signal therefrom and also to a B-Y signal terminal r of the demodulator Dm of the color process circuit CP, a comparator 15 coupled to the clamp circuits 13 and 14 and also to the VIR chroma gate pulse circuit 8 for receiving chroma separation pulse therefrom, a store 16 connected to the comparator 15 and a VIR killer switch 17 which is connected to the color gain adjuster p of the circuit CP and also to the killer out circuit 11 of the circuit B for receiving the killer signal therefrom, and a tint control circuit or tint level setting circuit D including a O chroma clamp circuit 18 coupled to R-Y signal terminal t of the demodulator Dm of the color process circuit CP and also to the VIR killer switch 17 of the color level automatic control signal generating circuit C and the vertical pulse gate 1 of the circuit A, a 0 level comparator 19 connected to the O chroma clamp 18 and also to the comparator 15 of the circuit C and the VIR chroma gate pulse generator 8 of the circuit B, and a store 20 connected to the comparator 19 and also to a VIR killer switch 21 which in turn coupled to the killer output 11 of the circuit B and the VIR killer switch 17 of the circuit C, and further to a VIR tint manual control 23.

By the above arrangement, functioning of the circuitry of FIG. 4 will be briefly explained hereinbelow for general understanding. Signal for desired channel is selected at the tuner b from the television waves received by the antenna a and is passed through the video detector d after having been amplified at the I.F. amplifier c, while the audio signal is processed in the audio circuit AD through the audio I.F. amplifier u, demodulator v and amplifier w for reproduction of sound at the speaker unit sp in the known manner. Meanwhile, the video signal is applied to the matrix j from the video output circuit i through the video process h for being displayed on the cathode ray tube k, and also to the color process circuit CP for separation therefrom of the burst signal through the band pass filter l, burst gate m and burst detector n. The burst signal thus separated is applied to the carrier wave restoration circuit o for synchronization of reference sub-carrier waves. The reference sub-carrier waves thus synchronized are applied to the tint control q of the color process circuit CP whereat the tint control is effected based on the sampled VIR signal and the control output thereof is applied to the color demodulator Dm of the circuit CP. On the other hand, the color signal separated at the band-pass amplifier l is applied to the color gain adjusting circuit p, and control of the color signal is effected based on the chroma reference signal obtained from the chroma signal separating circuit or color level automatic control signal generating circuit C according to the present invention which will be described in detail later. Meanwhile, the video signal separated at the video detector d is applied to the synchronizing separator f for separation of composite synchronizing pulse therefrom, which is further fed to the counting section or line sampling circuit A to separate the vertical synchronizing pulse through the vertical pulse gate 1. The vertical synchronizing pulse thus obtained is applied to the counter 5 to count, and upon counting of second pulse, the gate 1 is closed, with the flyback pulse gate 3 opened by the signal from the vertical synchronizing pulse decoder 4. Thus, the flyback pulse is applied to the counter 5 through the flyback pulse gate 3, and upon counting of 17 flyback pulses, the output of the counter 5 is fed to the VIR pulse decoder 7, from which VIR gate pulse of approximately one H time (i.e., time for each flyback line plus horizontal scanning line) is developed in the nineteenth line (FIGS. 2 and 3(b)). In the D.C. restorer 8', signal having a waveform in which D.C. component of the VIR signal containing chroma signal is inverted is produced, and a signal clamping D.C. component thus obtained is combined with the nineteenth pulse developed from the VIR detector at the VIR chroma gate pulse generator 8 for being applied to the color level setting section or color level automatic control signal generating circuit C of the present invention and the tint control setting section or tint control circuit D. Meanwhile, the output of the D.C. restorer 8' is applied to the VIR killer pulse generator 9 for detection of height of the D.C. output component so as to develop killer pulses in the absence of the VIR signal, and upon detection of the killer pulse at the VIR killer detection circuit 10, the killer output is developed from the killer output circuit 11. The killer output turns OFF the VIR killer switch 17 of the color level automatic control signal generating circuit C and the invention and the VIR killer switch 21 of the tint control circuit D for rendering these circuits inoperative. In the absence of the killer signal, the VIR indicator 12 is lit for indication of reception of the VIR signal. The tint control or tint level setting circuit D has the O chroma clamp circuit 18 which receives the output signal of the color demodulator Dm for clamping D.C. component of said output signal. During the vertical synchronizing pulse period, the R-Y output from the demodulator Dm is subjected to D.C. restoration so as to be retained up to the chroma signal period for comparison thereof with the R-Y output from the demodulator Dm during said chroma signal period. The function for such comparison is effected through the chroma reference signal from the gate pulse circuit 8 in the VIR killer pulse generator B. Upon comparison as described above, the difference therebetween is stored by one field in the store 20. The difference voltage thus stored is applied to the tint control q of the color process circuit CF for controlling the tint on the basis of the VIR reference. On the other hand, in the color level automatic control signal generating circuit C of the present invention, there are provided the O chroma clamp circuit 14 for clamping D.C. component of the B-Y signal from the demodulator Dm and the pedestal clamp circuit 13 for clamping the pedestal of the video output from the video output circuit i. The B-Y signal from the demodulator Dm and the video output from the video output circuit i which are respectively clamped in these clamp circuits 13 and 14 as described above are applied to the comparator 15 for comparison thereat, while the comparator 15 is actuated for such comparison by the chroma reference signal from the gate pulse circuit 8 in the VIR killer pulse generator B, and the difference therebetween is stored in the store circuit 16. The difference signal is further applied through the VIR killer switch 17 to the color gain adjust circuit p for controlling the color level so that the control signal of said difference signal is reduced to zero. In the absence of the VIR signal in the television signal being transmitted, the killer signal are applied from the killer output circuit 11 of the VIR killer signal generator B to the VIR killer switches 17 and 21 for turning these switches OFF.

It should be noted here that constructions and functions of the line sampling circuit A, VIR killer signal generator B and tint control circuit D are fully described in the co-pending applications, assigned to the same assignee of the present invention, and reference should be made thereto for further details thereof.

It should also be noted that in the drawings referred to hereinbelow, circuit portions corresponding to the circuit portions of FIG. 4 are surrounded by dotted lines with indications by the similar numerals and symbols for quick identification.

Referring particularly to FIG. 5, there is shown the connection of the color level automatic control signal generating circuit arrangement of the present invention with respect to related circuits of the color television receiver. In FIG. 5, the color level automatic control signal generating circuit C including circuit portions 13, 14, 15, 16 and 17 of FIG. 4 is coupled, at its output, to the color process circuit CP including therein the B-Y demodulator Dm-r, the output of which is applied to the matrix j of the color process circuit CP and also to the color level automatic control signal generating circuit C of the invention. Meanwhile, output of the video output i of the video circuit VD is applied to the matrix j for addition thereof to B-Y signal from the B-Y demodulator Dm-r so as to be further applied, with its value reduced by a predetermined degree by a variable resistor VR, to the generating circuit C. More specifically, the video signal (in this case, VIR signal) shown in FIG. 6(a) is decreased by the variable resistor VR so that the distance between a level L3 and level at the brightest portion becomes an amplitude of b' as shown in FIG. 6(b) for impression thereof to the control signal generating circuit C. Since the amplitude b' is the same as the amplitude b of the chroma signal of 3.58 MHz shown in FIG. 3, if the color process circuit CP is controlled in such a manner that the amplitudes of the video signal and the chroma signal compared at the circuit C are brought into agreement with each other, the result of composition of the B-Y signal and luminance signal at the matrix j exactly coincides with luminance reference level L2 shown in FIG. 3. Illustrated in FIG. 7(a) is the B-Y output to be applied to the matrix j during the chroma period of the VIR signal, while FIG. 7(b) represents video output having an amplitude of a during the same period, and the result of addition of the outputs in FIGS. 7(a) and 7(b) as described above produces an output having an amplitude c as shown in FIG. 7(c) to be led to the cathode ray tube k of the video circuit VD.

Figure 8:
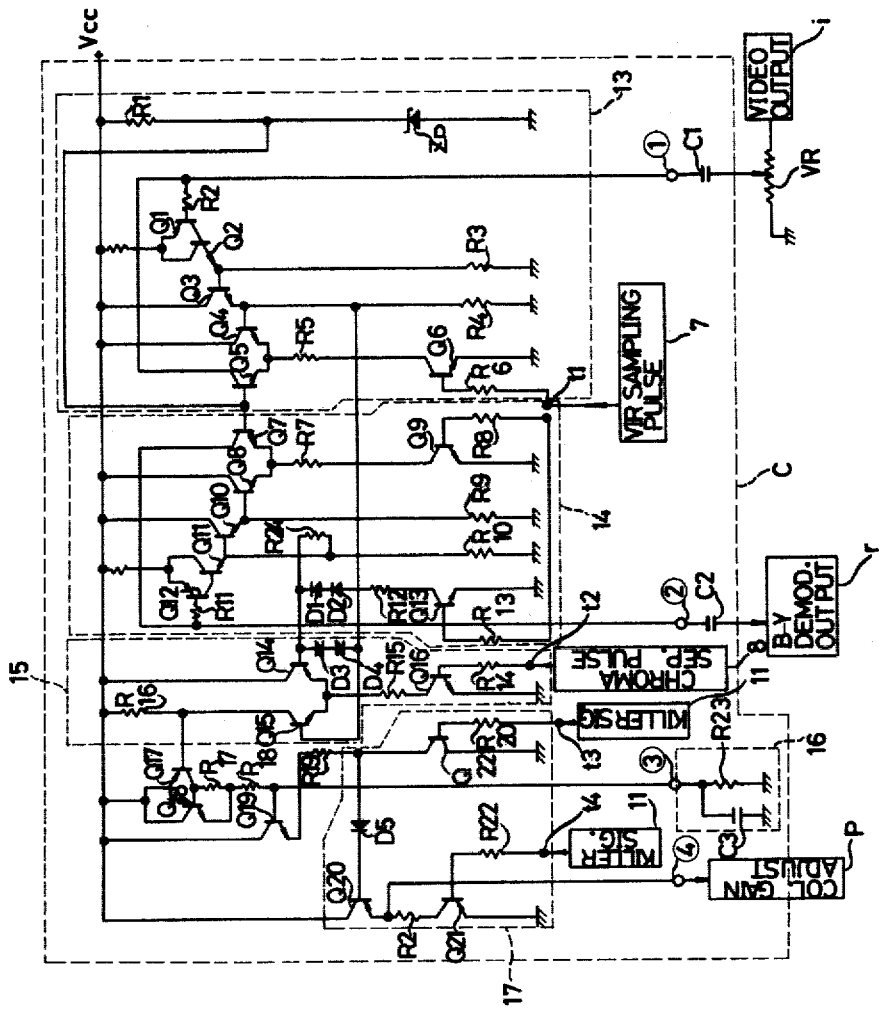
FIG. 8 is an electrical circuit diagram showing construction of the color level automatic control signal generating circuit arrangement of the present invention.

Referring particularly to FIG. 8, there is shown an electrical circuit diagram of the color level automatic control signal generating circuit C directly related to the present invention. The circuit C formed into an IC circuit as surrounded by a chain line IC in FIG. 8 includes a first pin ① to which the video signal is to be applied from the video output i of FIGS. 4 and 5 through the variable resistor VR and which is connected to the ground through a capacitor C1 and said variable resistor VR, and also to the base of a transistor Q1 through a resistor R2 and the collector of a transistor Q5. The emitter of the transistor Q1 is connected to +Vcc through a suitable resistor and to the collector of a transistor Q2, with the collector of the transistor Q1 connected to the base of the transistor Q2 whose emitter is connected to the base of a transistor Q3 and to the ground through a resistor R3. The collector of the transistor Q3 is connected to +Vcc, while the emitter thereof is coupled to the base of a transistor Q4 which forms a differential pair or amplifier together with the transistor Q5 and also to the ground through a resistor R4. The collector of the transistor Q4 is connected to +Vcc, while the emitter thereof is connected to the emitter of the transistor Q5, with a junction therebetween is further connected through a resistor R5 to the collector of a transistor Q6 whose emitter is connected to the ground and whose base is led through a resistor R6 to a point t1 whereat VIR sampling pulses (FIG. 3(b)) are to be applied. The base of the transistor Q5 is connected to the base of a transistor Q7 which forms another differential pair together with a transistor Q8, with a junction between the bases of the transistors Q7 and Q5 being connected to +Vcc through a resistor R1 and also to the ground through a zener diode ZD. The circuit C further includes a second pin ② to which the B-Y demodulation output of the demodulator Dm is to be applied and which is connected to the collector of the transistor Q7 and the base of a transistor Q12 through a resistor R11 and also to a capacitor C2. The emitter of the transistor Q7 is connected to the emitter of the transistor Q8 whose collector is coupled to +Vcc, while a junction between the emitters of the transistors Q7 and Q8 is further connected through a resistor R7 to the collector of the transistor Q9 whose emitter is grounded and whose base is connected through resistors R8 and R13 to the base of a transistor Q13, the emitter of which is grounded. The base of the transistor Q8 is connected to the emitter of a transistor Q10 which is further connected to the ground through a resistor R9, while the collector of the transistor Q10 is connected to +Vcc, with the base thereof coupled to the emitter of a transistor Q11 which is grounded through a resistor R10. The collector of the transistor Q11 is connected to +Vcc through a suitable resistor and also to the emitter of a transistor Q12 whose collector is connected to the base of the transistor Q11. A junction between the emitter of the transistor Q11 and the base of the transistor Q10 is coupled through a resistor R24 to the collector of the transistor Q13 via series connection of noise elimination limiter diodes D1 and D2 and resistor R12 and further to the base of a transistor Q14 which is connected through series connection of noise eliminating limiter diodes D3 and D4 to the base of a transistor Q15 and to a junction between the emitter of the transistor Q3 and the resistor R4. The emitters of the transistors Q14 and Q15 which form another differential pair are connected to each other, with the junction therebetween being further connected through a resistor R15 to the collector of a transistor Q16 whose base leads to a point t2 whereat chroma separation signal is to be applied and whose emitter is connected to the ground. The collector of the transistor Q15 is connected to +Vcc through a resistor R16, with the base thereof being connected to the junction between the emitter of the transistor Q3 and the base of the transistor Q4. The junction between the collector of the transistor Q15 and the resistor R16 is coupled to the base of a transistor Q17 whose emitter is connected to +Vcc and to the collector of a transistor Q18. The collector of the transistor Q17 is connected, through a series-connection of resistors R17 and R18, to a third pin ③ which is grounded through a parallel connection of a resistor R23 and a capacitor C3 and also to the base of the transistor Q18 whose emitter is coupled to a junction between the series-connected resistors R17 and R18, while a junction between the resistor R18 and the third pin ③ is connected to the base of a transistor Q19 whose collector is connected to +Vcc and whose emitter is connected to the collector of a transistor Q22 through a resistor R19. The base of the transistor Q22 is coupled through a resistor R20 to a point t3 to which the killer signal from the killer output 11 of the circuit B is to be applied, with the emitter thereof grounded. The junction between the resistor R19 and the collector of the transistor Q22 is connected to the base of a transistor Q20 through a diode D5, while the collector of the transistor Q20 is coupled to +Vcc. The collector of the transistor Q20 is connected to a fourth pin ④ for supplying output to the color gain adjuster p of the color process circuit CP and also to the collector of a transistor Q21 through a resistor R21, while the base of the transistor Q21 is connected through a resistor R22 to a point t4 to which the killer signal is also applied, with the emitter of the transistor Q21 grounded.

By the above arrangement, the video signal having opposite polarity (negative polarity) to that of the signal shown in FIG. 6(b) and applied from the video output i of FIG. 5 to the first pin ① through the variable resistor VR is inverted by the transistors Q1 and Q2 and is further impressed through the emitter-follower transistor Q3 to the base of the transistor Q4 forming the differential pair together with the transistor Q5 whose base is connected to the zener diode ZD to be maintained at a predetermined potential. Since the constant current source transistor Q6 is turned ON only during the one H time (FIG. 3(b)), functioning of the transistors Q4 and Q5 forming the differential pair are limited to such one H time (FIG. 3(b)). Accordingly, the capacitor C1 connected to the point ① is subjected to D.C. restoration so that the black level portion becomes equal to the voltage at the zener diode ZD. In other words, the black reference period of the VIR signal is fixed and held at the potential equal to base bias for the transistor Q5. It is to be noted here that the black reference may be replaced by pedestal level, because both of the above are respectively reduced in their values by resistance to have approximately similar values to each other. Similarly, the B-Y demodulation output from the B-Y demodulator Dm-r of FIG. 5 applied to the second pin ② is inverted in its polarity and applied to the base of the transistor Q8 forming the differential pair together with the transistor Q7 which is coupled to the zener diode in the similar manner as in the transistor Q5 mentioned earlier for being maintained at a predetermined potential. To the base of the constant current source transistor Q9, the pulse approximately of one H time as shown in FIG. 3(b) is applied in the similar manner as in the transistor Q6, and during such pulse period, the capacitor C2 connected to the second pin ② is subjected to D.C. restoration in the period without the chroma signal during the one H time (FIG. 3(b)). More specifically, the period without the chroma signal during the VIR period has potential equal to the base bias of the transistor Q7. In the manner as described above, the B-Y demodulation output and video output signal subjected to the D.C. restoration in the base bias of the transistors Q7 and Q5 are applied to a comparator 15 mainly composed of the differential pair constituted by the transistors Q14 and Q15. Since the chroma separation pulses of the VIR signal shown in FIG. 3(c) are applied to the base of the constant current source transistor Q16 for the comparator 15, the two output signals as described above are compared (FIG. 9) during such period. Accordingly, if there is any difference between levels of the B-Y demodulation output and luminance signal output in the amplitudes B1 and B2 thereof with respect to the reference level Eo during the chroma signal period of the VIR signal, signal corresponding to such difference is developed at the fourth pin ④ to be applied to the color gain adjusting circuit p of the color process circuit CP. For example, if the luminance signal level is large, current in the form of pulse flows through the transistor Q15 for charging the capacitor C3 connected to the third pin ③, with the output therefrom being applied to the fourth pin ④ as an output through the transistor Q19, diode D5 and transistor Q20.

It should be noted here that in the circuit of FIG. 8, the diodes D1 to D4 are used as the limiters for eliminating noises, while the transistors Q21 and Q22 are employed to make the output of the color level automatic control signal generation circuit C ineffective when the VIR signal is not being transmitted, and to develop the output at the fourth pin ④ of the circuit C when the television signal containing the VIR signal is being received, and that those transistors Q21 and Q22 are controlled by the signal from the VIR killer signal generator B in such a manner that the transistor Q22 is turned OFF in the presence of the VIR signal with the transistor Q21 turned ON and in the absence of the VIR signal, the transistor Q22 is turned ON, with the transistor Q21 turned OFF.

As is seen from the foregoing description, according to the arrangement of the present invention, since the video signal and B-Y demodulation signal are each subjected to the D.C. restoration, while these two signals are compared by the comparator to utilize the difference therebetween as the color level automatic control signal, there is no possibility that only one of the comparison signals undesirably varies as in the conventional arrangement, and thus accurate automatic control signal can advantageously be generated.

Figure 10:
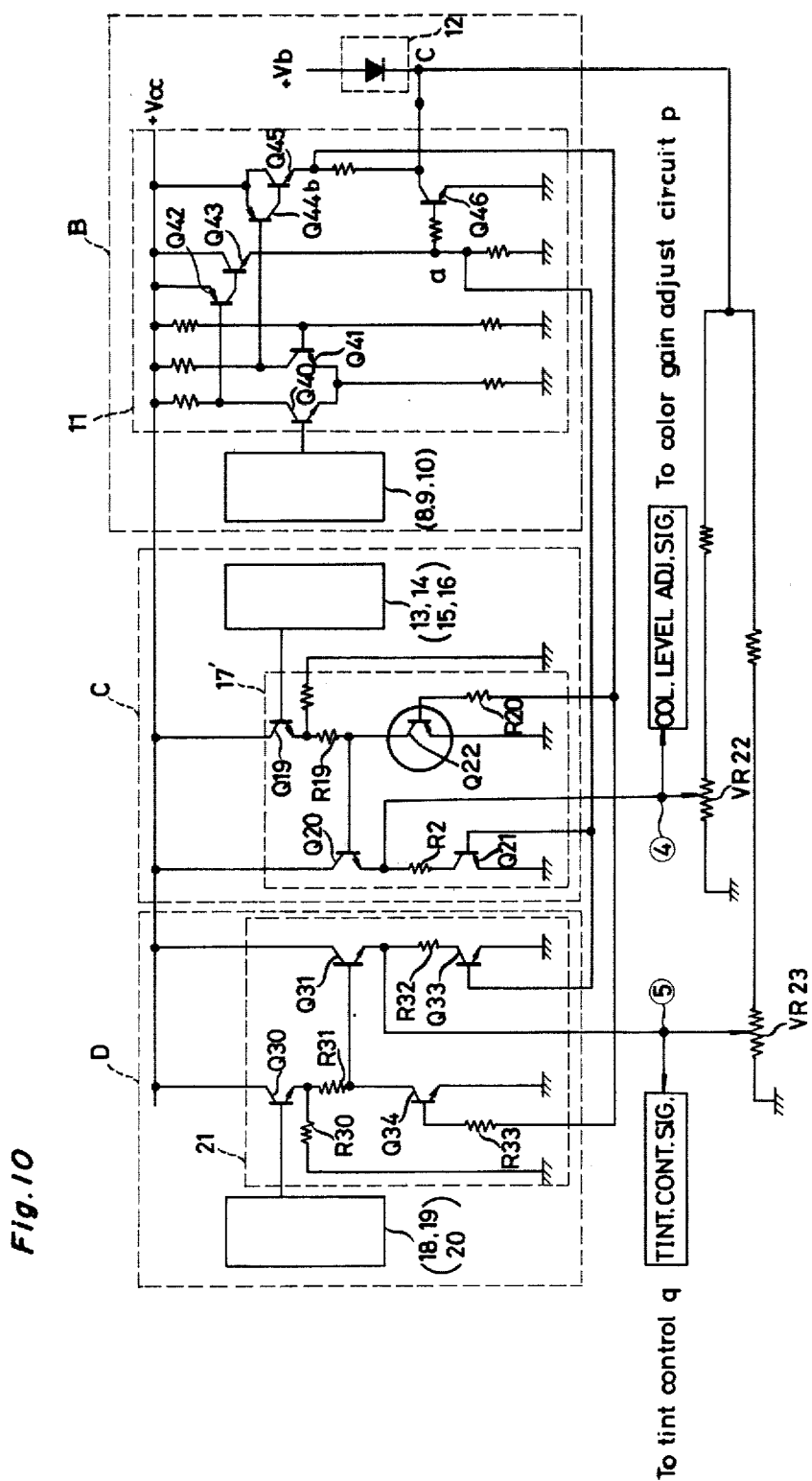
FIG. 10 is an electrical circuit diagram showing construction of a control signal change-over circuit to be associated with the color level automatic control signal generating circuit arrangement of FIG. 7.

Referring particularly to FIG. 10, there is shown a control signal change-over circuit to which the color level automatic control signal generating circuit C of FIG. 8 may be coupled for changing over between automatic control signal and manual control signal depending on automatic and manual modes of operation of the television receiver. It should be noted that the control signal change-over circuit of FIG. 10 is applicable not only to the color level automatic control signal generating circuit, but also to other control circuits for the television receiver such as the tint control circuit D and the like.

In the circuit of FIG. 10, the circuit portions 13, 14, 15 and 16 of the color level automatic control signal generating circuit C is coupled to the base of a transistor Q19 of the VIR killer switch 17' which is slightly modified as compared with the VIR killer switch 17 described with reference to FIG. 8 in that the diode D5 employed in the VIR killer switch 17 is dispensed with and that the junction between the collector of the transistor Q19 and resistor R19 is grounded through a suitable resistor, while other circuit constructions are generally the same as in FIG. 8. The line leading from the junction of the emitter of the transistor Q20 and the resistor R2 to the terminal pin ④ is further connected to a slider of the VIR color manual control variable resistor VR22 which is connected at its one end to the ground and at its other end, to +Vb through a suitable resistor and the VIR indicator or light emitting diode 12, and also, through another resistor, to one end of the VIR tint manual control variable resistor VR23 which is grounded at the other end. The base of the transistor Q21 is further connected to the emitter of a transistor Q43 in the killer signal generating circuit B and to the ground through a suitable resistor and also to the base of a transistor Q46, through another resistor, whose collector is grounded.

It should be noted that in the above arrangement, the resistor R2 and the switching transistor Q21 inserted between the emitter of the transistor Q20 and reference potential point for deriving output from the emitter of the transistor Q20 may be dispensed with depending on necessity. In the similar manner, the circuit portions 18, 19 and 20 of the tint control circuit D are coupled, in the VIR killer switch 21, to the base of a transistor Q30 whose collector is connected to +Vcc and whose emitter is connected, through a resistor R31, to the base of a transistor Q31 and the collector of the transistor Q34, and also to the ground through a resistor R30 with the emitter of the transistor Q34 grounded and the base thereof connected through the resistors R33 and R20 to the base of the transistor Q22 in the circuit C and also to the emitter of the transistor Q45 of the circuit B. The collector of the transistor Q31 is connected to +Vcc, while the emitter thereof is connected through a resistor R32 to the collector of the transistor Q33 whose collector is grounded, with the base thereof connected to the base of the transistor Q21 of the color level automatic control signal generating circuit C. The collector of the transistor Q31 is further connected, through the tint control signal output terminal ⑤, to a slider of the tint control signal manual control variable resistor VR23 which is connected to the ground at its one end and to +Vb at its other end through the light emitting diode 12 mentioned earlier. Meanwhile, the circuit portions 8, 9 and 10 of VIR killer pulse generator B are coupled, in its killer output circuit 11, to the base of a transistor Q40 whose collector is connected to the base of a transistor Q42 and to +Vcc through a suitable resistor, while the emitter of the transistor Q40 is connected to the emitter of a transistor Q41 and also to the ground through a suitable resistor. The collector of the transistor Q41 is connected to +Vcc through a suitable resistor and also to the base of the transistor Q44 whose emitter is connected to +Vcc and also to the collector of a transistor Q45, with the collector of the transistor Q44 connected to the base of the transistor Q45. The base of the transistor Q41 is connected to +Vcc and also to the ground through suitable resistors respectively. The emitter of the transistor Q42 is connected to +Vcc and the collector thereof is connected to the base of the transistor Q43 whose collector is connected to +Vcc and whose emitter is connected to the line from the base of the transistor Q33 of the circuit D mentioned earlier. Meanwhile, the emitter of the transistor Q45 connected to the line from the bases of the transistors Q22 and Q34 of the circuits C and D is also connected through a suitable resistor to the collector of the transistor Q46 which is further connected to +Vb, while the emitter of the transistor Q46 is grounded.

By the above arrangement, the color level automatic control signal is applied from the emitter of the transistor Q20 to the output terminal ④ to be further applied to the color gain adjust circuit p of the color process circuit CP (FIG. 4). The terminal ④ is connected to the slider of the variable resistor VR22 for picking up the voltage set thereat. The transistor Q22 is the switching transistor inserted between the passage of the color level control signal and the ground, and is arranged to be turned ON by the VIR killer signal to cause all of the color level control signal to flow into the ground so as not to be applied to the transistor Q20. Since the circuit related to the tint control signal including the transistors Q30 to Q34, resistors R30 to R33 and variable resistor VR23 has the same construction and function as those described in the foregoing with reference to the color level control signal, detailed description thereof is abbreviated for brevity. Meanwhile, the VIR killer signal generator B functions to detect whether the VIR signal is present in the television signal or not, and in the presence of the VIR signal, turns ON the transistor Q40 which forms the differential pair together with the transistor Q41. Consequently, during reception of the television signal including the VIR signal, the transistors Q42 and Q43 are turned ON to produce "High" level at a point "a" at the right in FIG. 10, while, at a point "b", "Low" level is produced through turning OFF of the transistors Q44 and Q45 and turning ON of the transistor Q46, with simultaneous illumination of the VIR indicator or light emitting diode 12 for indication that the automatic control is in operation. Since the transistors Q33 and Q21 are rendered conductive due to "High" level of the potential at the point "a" and the transistors Q34 and Q22 are rendered non-conductive due to ∓Low" level of the potential at the point "b", respective automatic control signals are developed at the output terminals ⑤ and ④. In the above case, since the potential at a point "c" (shown immediately before the light emitting diode 12 in FIG. 10) is reduced almost to the ground potential due to conduction of the transistor Q46, resistance between the sliders of the variable resistors VR22 and VR23 and the ground serves only as the emitter load of the transistors Q31 and Q20, thus function for the manual control being interrupted. However, during reception of television signal not including the VIR signal, the VIR killer signal generator B turns OFF the transistor Q40, with the transistors Q42 and Q46 being all inverted in their state, and thus the potential at the point "a" is rendered to be of "Low" level, while the potentials at the points "b" and "c" are rendered to be of "High" level. Consequently, the transistors Q34 and Q22 are turned ON, and the transistors Q31 and Q20 and also Q33 and Q21 are turned OFF. Accordingly, at the output terminals ④ and ⑤, the manual control voltages respectively set by the variable resistors VR22 and VR23 are developed.

As is clear from the foregoing description, according to the arrangement in FIG. 10 of the present invention, the change-over circuit for the automatic control signals is conveniently constituted so that the variable resistance for the manual control signal becomes the emitter load of the transistor for supplying the automatic control signals while the automatic control signal is being supplied, and thus the disadvantage in the conventional arrangements that one signal system is undesirably affected by the other supplying of signal is advantageously eliminated.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A circuit for use in color television receivers for generating color level automatic control signals through utilization of VIR signals included in a vertical retrace period of a television signal being transmitted, said color level automatic control signal generating circuit comprising means for subjecting to a first D.C. restoration, the output of a demodulator for detecting a chroma signal at a predetermined level during one H time of a line containing the VIR signal, variable means for dividing the video output of the television signal by a predetermined amount, means for subjecting to a second D.C. restoration, the divided video output at the same level as the level of said first D.C. restoration during the one H time, and means for comparing said demodulator output with said divided video output during the chroma signal period of the VIR signal, and for providing the output difference therebetween as the color level automatic control signal.

2. A color level automatic control signal generating circuit as claimed in claim 1, wherein said demodulator is a B-Y demodulator, with the reference levels for said first and second D.C. regenerations being the black level.

3. A color level automatic control signal generating circuit as claimed in claim 2, wherein said video detection output has a level approximately equal to the output of said B-Y demodulator in the chroma signal period of the VIR signal.

4. A color level automatic control signal generating circuit as claimed in claim 1, further including a control signal change-over means coupled thereto, said control signal change-over means comprising a transistor element which receives, at its first electrode, the output of said color level automatic control signal generating circuit, and a manual control variable resistance connected, at its variable terminal, to a second electrode of said transistor element said second electrode forming the output of said transistor element, power supply means for supplying power to said manual control variable resistance, first means for applying said manual control variable resistance as the load on said second electrodes of said transistor element during automatic control when power supplied from the power supply means to said manual control variable resistance is cut off, and second means for cutting off the supply of the automatic control signal to said transistor element during manual control.

5. A color level automatic control signal generating circuit as claimed in claim 4, wherein said control signal change-over means further includes a resistance and switching element coupled between the second electrode of said transistor element and the reference potential point for deriving an output from said second electrode of said transistor element such that during automatic control, said switching element is turned ON, and said manual control variable resistance is the load on said transistor element, and during manual control, said switching element is turned OFF and the automatic control signal is not applied to said transistor element.

6. A method of generating a color level automatic control signal for use in television receivers using a VIR signal included in a vertical retrace interval of the television signal being transmitted, said method comprising the steps of subjecting to first D.C. restoration, the output of a demodulator for detecting a chroma signal at a predetermined level during one H time of a line containing the VIR signal, dividing the video output of the television signal by a predetermined variable amount, subjecting to second D.C. restoration, the divided video output at a level the same as said predetermined level of said first D.C. restoration during the VIR signal period, and comparing said demodulator output with said divided video output during the chroma signal period of the VIR signal, and providing an output of the difference therebetween as color level automatic control signal.

7. A control signal change-over circuit for the selective changing over of an automatic control signal and a manual control signal according to automatic and manual modes of operations of said circuit comprising a single transistor element which receives, at a first electrode, the output of an automatic control signal generating circuit, a manual control variable resistance connected, at its variable terminal, to a second electrode of said transistor element, said second electrode forming the automatic control signal and manual control signal output of said transistor element, power supply means for supplying power to said manual control variable resistance, first means for applying said manual control variable resistance as the load on said second electrode of said transistor element during automatic control when power supplied from the power supply means to said manual control variable resistance is cut off, and second means for cutting off the supply of the automatic control signal to said transistor element during manual control.

8. A control signal change-over circuit as claimed in claim 7, wherein said first means includes a resistance and switching element coupled between the second electrode of said transistor element and a reference potential point for deriving an output from said second electrode of said transistor element, such that during automatic control, said switching element is turned ON, and said manual control variable resistance is the load on said transistor element, and during manual control, said switching element is turned OFF and the automatic control signal is not applied to said transistor element.

9. A control signal change-over circuit as claimed in claim 7, wherein said automatic control signal generating circuit is a color level automatic control signal generating circuit.

10. A control signal change-over circuit as claimed in claim 7, wherein said automatic control signal generating circuit is a tint control circuit.

* * * * *